United States Patent [19]

Dellis

[11] Patent Number: 5,155,878
[45] Date of Patent: Oct. 20, 1992

[54] MOLDABLE HAND GRIP

[76] Inventor: Edward A. Dellis, 1360 SW. 17th St., Boca Raton, Fla. 33486

[21] Appl. No.: 684,776

[22] Filed: Apr. 15, 1991

[51] Int. Cl.$^5$ .................... B29C 33/40; B29C 71/02; A63B 53/14
[52] U.S. Cl. .................... 16/111 R; 16/DIG. 12; 40/628; 74/551.9; 81/489; 264/222; 264/322; 264/DIG. 30; 273/81.4; 374/162
[58] Field of Search ............ 16/110 R, 111 A, 111 R, 16/114 R, DIG. 12, DIG. 19; 74/551.9; 81/489; 220/94 R; 264/222, 279.1, 322, DIG. 30; 272/68; 273/75, 81.4; 73/762; 374/162; 116/207, 216, DIG. 41; 428/204, 207; 40/615, 626, 628, 661, 913, 915

[56] References Cited

U.S. PATENT DOCUMENTS

| | | | |
|---|---|---|---|
| 2,202,253 | 5/1940 | Hiatt | 40/913 |
| 3,468,744 | 9/1969 | Reinhart | 40/615 |
| 4,053,676 | 10/1977 | Kaminstein | 273/75 |
| 4,137,769 | 2/1979 | Parker | 374/162 |
| 4,785,495 | 11/1988 | Dellis | 16/111 R |
| 4,934,024 | 6/1990 | Sexton | 16/111 R |
| 4,981,737 | 1/1991 | Rico | 74/551.9 |

Primary Examiner—Lowell A. Larson
Assistant Examiner—Thomas C. Schoeffler
Attorney, Agent, or Firm—Alvin S. Blum

[57] ABSTRACT

Hand grips for the handles of devices such as motorcycles, tennis rackets, and guns can be custom-molded to fit exactly the contours of the user's hand. The grip has an inner layer that is thermoplastic and moldable at molding temperatures reached by heating with hot water or a hair dryer. An adherent outer, resilient, vibration-resistant layer is stable at these molding temperatures. The user heats the grip to molding temperature and then rapidly cools the outer surface to a comfortable temperature. The grip is then grasped by the hand while the inner layer is still at molding temperature. The hot inner layer conforms to the hand, becoming thinner under the fingers and thicker between fingers. The grip is cooled to ambient temperature and the inner layer retains its hand-conforming shape. The outer layer maintains its original thickness providing a fixed resilient cushioning layer over the custom formed inner layer. Optionally, the layers of the grip may be light transmitting and the inner formable layer may be colored so that the molded handle will have a distinctive color pattern, deeper between fingers and lighter at finger depressions. Identifying material may be applied to the undersurface of the grip to show through the layers.

7 Claims, 1 Drawing Sheet

MOLDABLE HAND GRIP

BACKGROUND OF THE INVENTION

This invention relates to hand grips and more particularly to grips that can be molded and remolded to conform to the contours of the hand of a particular user.

To make the most effective use of an implement that must be grasped by the hand, the implement should conform to the shape of the hand that grasps it. A common approach is to provide a contoured grip generally conforming to an average hand and having a resilient outer layer that yields at points of greatest pressure to thereby conform to individual differences. If this layer is soft enough to conform readily, the implement is not held securely unless the hand grips tightly. If this layer is firm, then there is inadequate conformation. U.S. Pat. No. 4,785,495 issued Nov. 22, 1988 to Dellis discloses a grip having a layer of a thermoplastic material that may be softened enough to be remoldable by heating to a temperature that can be safely grasped by the hand. When a grip of this type is heated by a hair dryer or hot water, the user may grasp the handle and mold the contours of the hand into this layer. The shape will be retained upon cooling to produce a custom-molded hand grip unique to that hand. An inner layer that is resilient and shock absorbing but will not soften at those temperatures is provided so that there will always be a useful resilient layer beneath even the narrowest diameter of the molded grip with that inner layer also limiting the narrow diameter. This ensures that shock and vibration will not be transmitted through to the hand. U.S. Pat. No. 4,934,024 issued Jun. 19, 1990 to Sexton also discloses a heat moldable grip.

Grips of the prior art, where the outer layer is the heat-moldable layer, present certain problems. It may be difficult to find a material that combines the low temperature moldability with good surface friction, cut and tear resistance and softness. Furthermore, the upper temperature limit of moldability must be low enough to be safely grasped by the hand. This may be so low that the grip may inadvertently be remolded by exposure to temperatures in a hot car trunk, for example. Both Sexton U.S. Pat. No. (4,934,024) and Dellis U.S. Pat. No. (4,785,795) teach the use of ethylene vinyl acetate for the heat moldable plastic layer. It is well known in the art that this material is so sticky when warmed that it is frequently used as an adhesive. This property interferes with its use as a grip when on the outer layer of the grip, since it attracts and holds dirt.

SUMMARY OF THE INVENTION

It is accordingly an object of the invention to provide hand grips that can be molded to the unique shape of the hand by heating to a high temperature that can be safely grasped by the hand and released so as to form a custom contoured grip stable at ambient temperatures. It is another object of the invention to provide a grip whose surface and subsurface properties may be selected from materials that are not remoldable at low temperatures. It is yet another object of the invention to provide such a remoldable grip that is provided with a uniform thickness of a resilient, shock-absorbing material on the outside of the heat moldable layer that is not sticky.

The moldable and remoldable grip of the invention is provided with an inner, first layer of a thermoplastic material that becomes plastic and moldable at a temperature that can be reached with boiling water or a hair dryer. It is provided with an outer, second layer of resilient, shock absorbent material of uniform thickness adherent to the first layer. The second layer does not become plastic at the temperatures required to mold the first layer. When the heated grip is grasped, the inner first layer, being plastic, conforms to the hand, thinning out at the fingers and thickening in the interdigital space. When cooled, the inner layer retains this configuration while the outer, second layer provides a uniform thickness covering of resilient material to the hills and valleys of the first layer. With this invention, it is possible to use a higher melting first layer material by a unique molding method. The grip is heated up to the particular softening temperatures and held at that temperature long enough for the heat to penetrate through the second layer to the first layer. Then the second layer is cooled to a comfortable temperature such as by plunging it into cold water long enough to cool the outer surface, but not the inner layer. The grip is then grasped by the hand while the inner layer is still soft to mold it to the hand shape.

In an alternative embodiment of the invention the layers are light transmitting and the heat conformable layer is colored so that a visibly distinctive color pattern of thin and thick portions of that layer is provided. The grip may be provided with an adhesive inner surface for adherence to the implement. This adhesive may be provided on a carrier with distinctive indicia such as a logo arranged to show through the layers for identification or advertising purposes.

These and other objects, features and advantages of the invention will become more fully apparent when the following detailed description of the preferred embodiments of the invention is read in conjunction with the accompanying drawings.

DETAILED DESCRIPTION OF PREFERRED EMBODIMENTS

Figure 1:
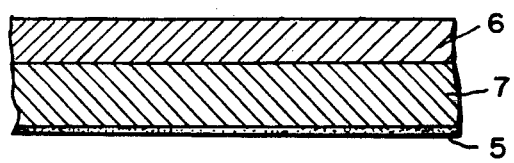
FIG. 1 is a longitudinal section through a portion of the formable grip before heating.
Figure 2:
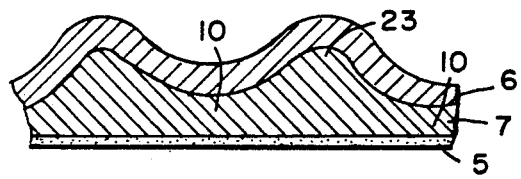
FIG. 2 is a longitudinal section through a portion of the grip after heating.
Figure 3:
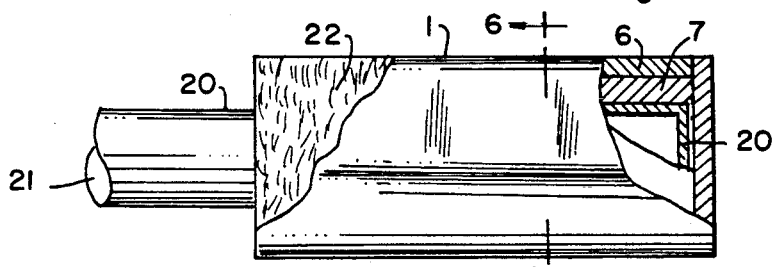
FIG. 3 is a front elevation of the hand grip of the invention in place before heating and forming, with a portion broken away.
Figure 4:
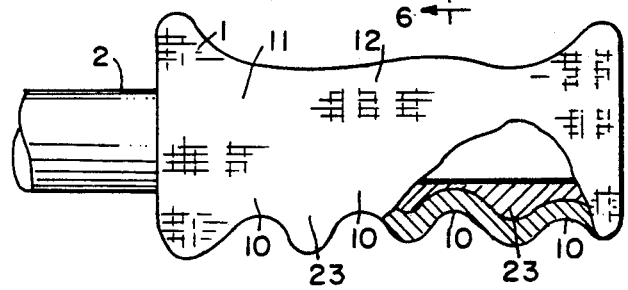
FIG. 4 is a front elevation of the hand grip of the invention in place after heating and forming by grasping with the hand, with a portion broken away.

Referring now first to FIGS. 3 and 4, a sleeve-like hand grip 1 of the invention slides onto motorcycle handlebar 2. Heat is then applied to hand grip 1 with a hair dryer until the formable inner layer 7 is hot enough to mold. Then water is poured over the grip 1 until the outer layer is cool enough to handle. The person who will use the motorcycle and for whom the grips are to be customized then grasps the hand grips in the position of ordinary use and then releases them. The hand grip takes the permanent shape shown in FIGS. 2 and 4, with the grip now contoured to the hand shape with the impressions formed by the palm 12, the thumb 11, and the fingers 10 as shown. Furthermore, the hand grip is now firmly cemented to the handlebar 2 by the hot melt adhesive 5 lining the sleeve as shown in FIGS. 1, 2. Alternatively, there may be no adhesive lining and adhesive may be applied to the handlebar 2 before slipping the grip in place. As shown in FIG. 3, the grip 1 may be provided on a hollow, metal tube 20 closed at one end and having a diameter close to that of the handlebar. Boiling water is poured into the open end 21 and the hand grasps the grip until the inner layer 7 becomes moldable and takes the impression of the hand. Then the water is poured out and the grip allowed to cool down, before the grip is removed from the tube 20 and applied to the handlebar with adhesive. By this method, the outer surface of the grip is not heated to an uncomfortable temperature.

Figure 6:
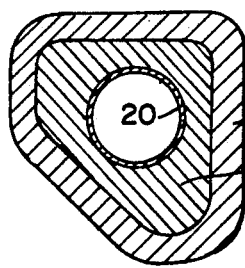
FIG. 6 is a cross sectional view of a profile coextrusion embodiment of the invention, taken on line 6—6 of FIG. 3.

As shown in FIG. 3, the surface 22 of the grip may be treated by embossing, flocking and the like for enhanced appearance or feel. The moldable inner layer 7 is made thick enough to provide for molded depressions corresponding to the fingers deep enough for a firm grip. As best seen in FIG. 6, this thickness may vary about the axis. The material for inner layer 7 is a heat formable plastic that retains its shape at ambient temperatures but becomes plastic and formable at temperatures easily reached by boiling water or a hair dryer. As best seen in FIGS. 2, 4, the pressure of the fingers has forced the plastic 7 out of the regions of greatest pressure, leaving finger impressions 10, and thicker interdigital spaces 23. The inner and outer layers may be transparent or translucent. The inner layer 7 may be colored. After forming, the thicker, interdigital portions 23 will have a deeper color than the thinner, digital portions 10 of the layer as shown in FIG. 4. The outer layer 6 may be provided with another color. Each molded grip will then have its own distinctive color pattern.

The outer, resilient layer 6 is firmly adherent to the inner layer 7 so that it follows the formed contours. It is formed of a material that will not mold at the temperatures used to mold the inner layer. The material is selected for its resilience and shock and vibration absorbing properties. It has surface properties of high friction and abrasion and tear resistance. It is formed with sufficient thickness as to form an insulating layer to enable the hand to grasp the grip while the inner layer 7 is hot enough to mold. This arrangement enables the selection of a higher softening point formable plastic than when the formable layer is on the outside. The outer layer has a thickness greater than one fifth of the thickness of the inner layer.

Figure 5:
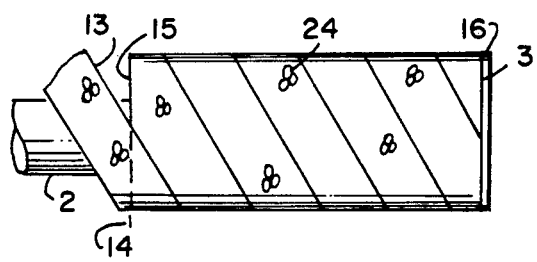
FIG. 5 is a front elevation illustrating the tape embodiment of the invention with logo being applied.

The grip may be formed by coextrusion of a tube as in FIG. 3. There may be applications where the grip is best wrapped onto the implement such as a tennis racket, crutch, rifle. In that case a sheet or tape material having the cross section of FIG. 1 may be provided. FIG. 5 shows how a tape 13 of the invention is applied to the implement 2. The tape was wrapped from the rear end forward. The rear edge 16 was trimmed square and trim tape 3 is wrapped on. Now the front edge 15 is being trimmed at the cut line 14. After trimming, trim tape will be wrapped on similarly to the tape at 3 for a finished appearance. The tape or sheet may be provided with a pressure sensitive adhesive layer 5 for easier application. Indicia in the form of a logo 24, a tradename, identification or the like, may be applied to the inner aspect of the grip, as shown in FIG. 5 to show through the upper layers. This may be applied to the pressure sensitive inner adhesive layer if it is transparent.

The heat moldable layer may optionally be colored with a coloring agent that changes color with temperature so that the user will known when the layer is at molding temperature.

Figure 7:
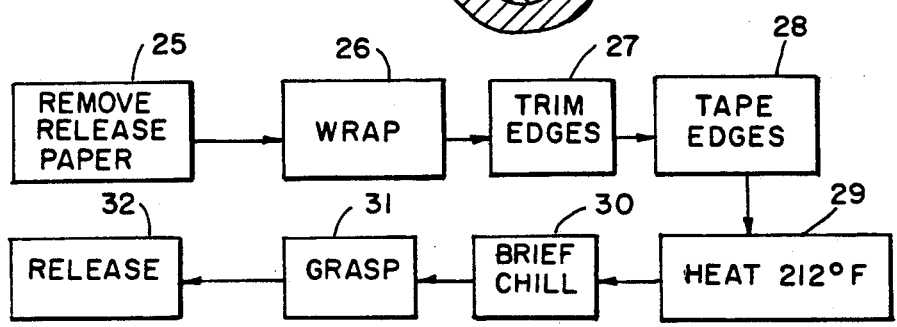
FIG. 7 is a diagrammatic illustration of the method of custom forming the grip without discomfort to the operator.

The method of preparing a custom molded grip on, for example, a tennis racket, with tape of the invention having a pressure sensitive adhesive layer protected by a release paper well known in the adhesive art is shown in FIG. 7. In the first step 25, the protective release paper is stripped away. In the next step 26, the tape is wrapped on the handle. In the next step 27, the ends are trimmed square. In the next step 28, decorative vinyl tape is wrapped over the edges. In the next step 29, the handle is dipped in boiling water until the inner layer is hot enough to mold. In the next step 30, the handle is dipped in water until the outer surface is cool enough to grasp, while the inner layer is still soft. In the next step 31, the handle is grasped, molding the inner layer to the hand, while the outer layer provides a substantially uniform-thickness cushioning layer. In the next step 32, the handle is released and allowed to cool to room temperature. The handle is now provided with a custom molded grip that will retain that shape until reheated.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. Hand grip means attachable to a handle of a device and moldable to fit a hand of an individual person, comprising:
    a) a heat moldable, inner, first layer capable of plastic forming to a shape of a grasping hand under pressures of said hand when heated to a molding temperature in the range from about 28° C. to about 100° C. that retains said shape after cooling;
    b) a flexible, outer, second layer adherent to said first layer, said second layer not heat moldable at said molding temperature and having physical properties selected from the group of properties consisting of thermal insulation, vibration absorption, shock absorption and resilience, said second layer providing a fixed thickness of material between said hand and said first layer for improved operation of said grip means, in which said first and second layers are light transmitting, and said first layer has a first color, whereby a depth of color will correspond to a varied thickness of said first layer after molding, to provide a unique color pattern for each molded grip.

2. The hand grip means according to claim 1, in which said second layer has a second color.

3. Hand grip means attachable to a handle of a device that is moldable to fit a hand of an individual person with an optically distinctive color pattern, said grip means comprising:

a) a heat moldable first layer capable of plastic forming to a shape of a grasping hand under pressures of said hand when heated to a molding temperature in the range from about 28° C. to about 100° C. that retains said shape after cooling;

b) a second layer adherent to said first layer, said second layer not heat moldable at said molding temperature and having physical properties selected from the group of properties consisting of thermal insulation, vibration absorbtion, shock absorbtion and resilience, said second layer providing a fixed thickness of material between said hand and said device;

c) said first and second layers being light transmitting and said first layer having a first color, whereby said hand grip means presents a uniquely colored pattern in which a depth of color corresponds to a varied thickness of said first layer that is characteristic of a particular molded configuration.

4. The hand grip means according to claim 3, in which said second layer has a second color.

5. The hand grip means according to claim 3, further comprising indicia bearing means for bearing indicia attached to an inner surface of said grip means for visualization through said first and second layer.

6. The hand grip means according to claim 3, in which said first layer has optical properties that change with temperature whereby said optical properties indicate when said first layer is at said molding temperature.

7. Hand grip means attachable to a handle of a device that is moldable to fit a hand of an individual person with an optically distinctive color pattern, said grip means comprising:

a heat moldable layer capable of plastic forming to a shape of a grasping hand under pressures of said hand when heated to a molding temperature in the range from about 28° C. to about 100° C. that retains said shape after cooling, said layer being light transmitting and having a color, whereby said hand grip means presents a uniquely colored pattern in which a depth of color corresponds to a varied thickness of said first layer that is characteristic of a particular molded configuration, and having indicator means with optical properties that change with temperature, whereby said optical properties indicate when said layer is at said molding temperature.

* * * * *